United States Patent [19]

Nakajima et al.

[11] Patent Number: 4,810,887

[45] Date of Patent: Mar. 7, 1989

[54] RADIATION IMAGE READ-OUT METHOD AND APPARATUS

[75] Inventors: Nobuyoshi Nakajima; Shigemi Fujiwara, both of Kanagawa, Japan

[73] Assignees: Fuji Photo Film Co., Ltd.; Toshiba Corporation, both of Kanagawa, Japan

[21] Appl. No.: 916,433

[22] Filed: Oct. 7, 1986

[30] Foreign Application Priority Data

Oct. 7, 1985 [JP] Japan ................................ 60-223205

[51] Int. Cl.$^4$ ............................................. G01N 23/04
[52] U.S. Cl. ................................ 250/327.2; 250/484.1; 364/413.13
[58] Field of Search ................ 250/327.2, 484.1; 364/414

[56] References Cited

FOREIGN PATENT DOCUMENTS 0170270 2/1986 European Pat. Off. ......... 250/327.2

*Primary Examiner*—Carolyn E. Fields
*Assistant Examiner*—Richard Hanig
*Attorney, Agent, or Firm*—Sughrue, Mion, Zinn, Macpeak & Seas

[57] ABSTRACT

In a radiation image read-out method and apparatus, preliminary read-out is conducted prior to final read-out for adjusting read-out conditions in the final read-out and/or image processing conditions for a radiation image stored on a stimulable phosphor sheet. When the radiation image is read out from the stimulable phosphor sheet subjected to subdivision image recording, an image signal at a subdivision unexposed to a radiation is eliminated from preliminary read-out image signals, which are obtained by the preliminary read-out, on the basis of information on the subdivision image recording. The read-out conditions in the final read-out and/or image processing conditions are adjusted based on the remaining preliminary read-out image signals.

5 Claims, 2 Drawing Sheets

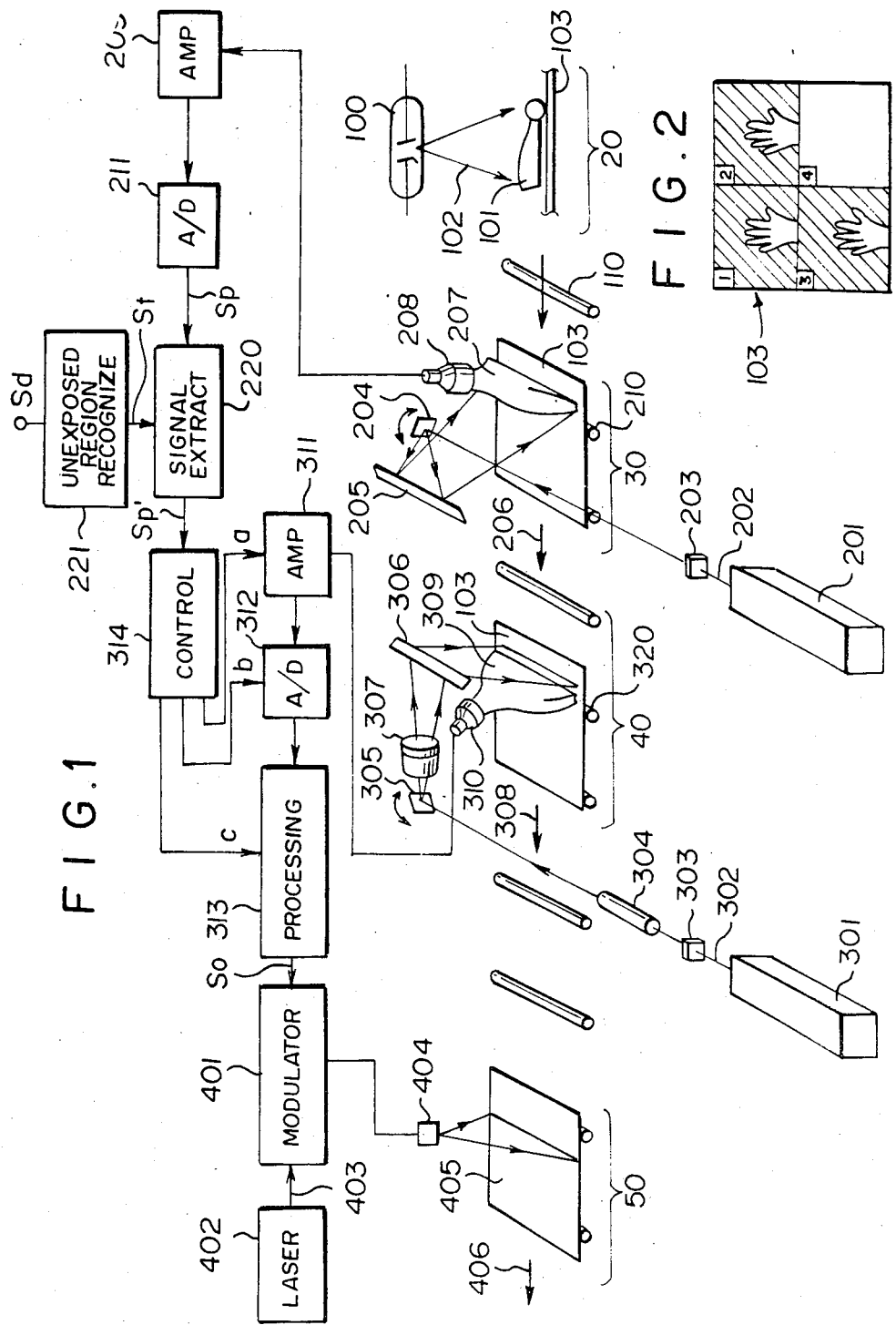

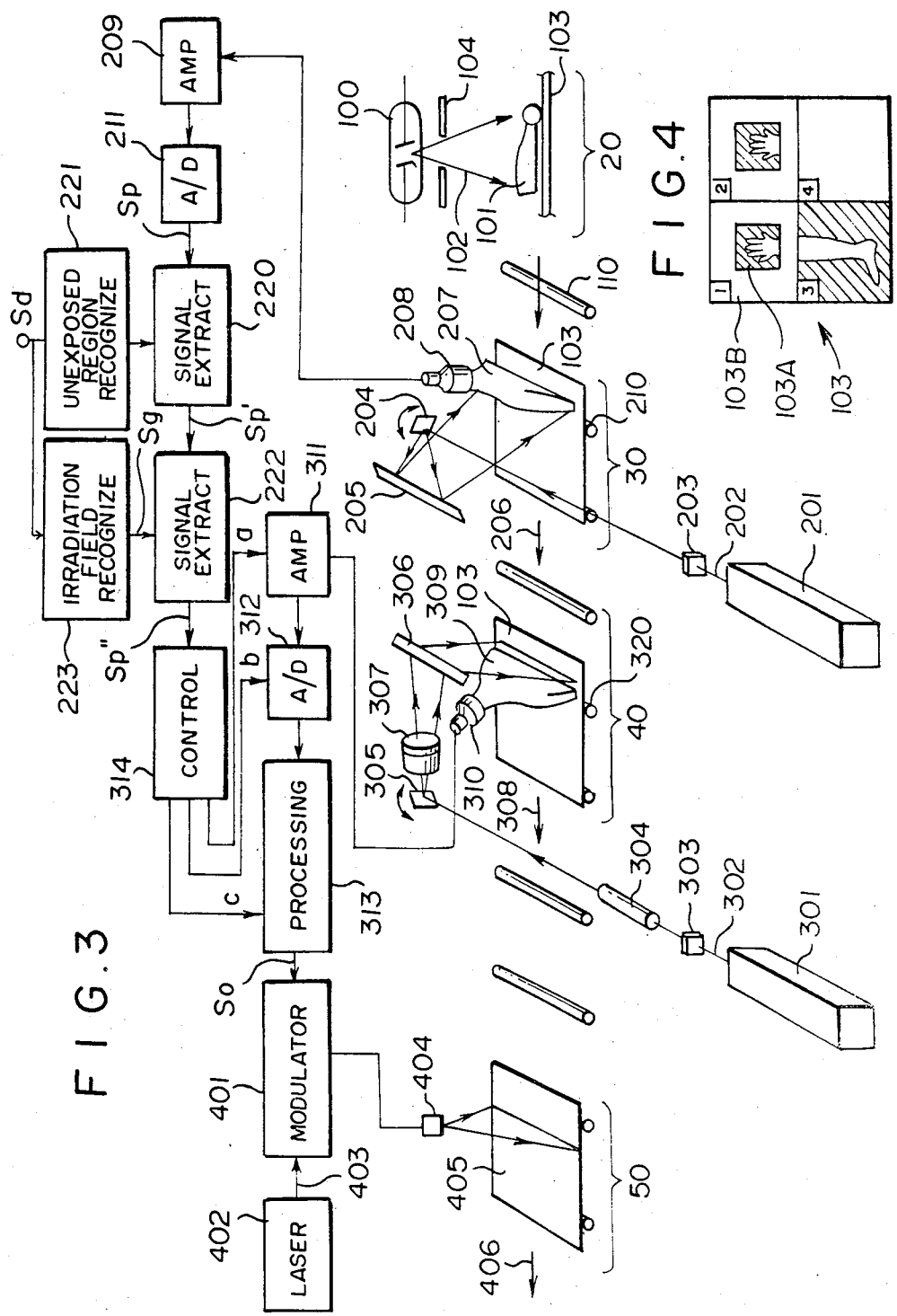

RADIATION IMAGE READ-OUT METHOD AND APPARATUS

BACKGROUND OF THE INVENTION

1. Field of the Invention

This invention relates to a radiation image read-out method for exposing a stimulable phosphor sheet carrying a radiation image stored thereon to stimulating rays which cause the stimulable phosphor sheet to emit light in proportion to the stored radiation energy, photoelectrically detecting the emitted light, and thereby reading out the radiation image. This invention particularly relates to a radiation image read-out method wherein preliminary read-out is conducted for approximately ascertaining the image input information prior to final read-out for reproducing a visible image, and the approximate ascertainment of the image input information is effected correctly when a radiation image is read out from a stimulable phosphor sheet subjected to subdivision image recording. This invention also relates to an apparatus for carrying out the method.

2. Description of the Prior Art

When certain kinds of phosphors are exposed to a radiation such as X-rays, α-rays, β-rays, γ-rays, cathode rays or ultraviolet rays, they store a part of the energy of the radiation. Then, when the phosphor which has been exposed to the radiation is exposed to stimulating rays such as visible light, light is emitted by the phosphor in proportion to the stored energy of the radiation. A phosphor exhibiting such properties is referred to as a stimulable phosphor.

As disclosed in U.S. Pat. No. 4,258,264 and Japanese Unexamined Patent Publication No. 56(1981)-11395, it has been proposed to use a stimulable phosphor in a radiation image recording and reproducing system. Specifically, a sheet provided with a layer of the stimulable phosphor (hereinafter referred to as a stimulable phosphor sheet) is first exposed to a radiation passing through an object to have a radiation image stored thereon, and is then scanned with stimulating rays such as a laser beam which cause the stimulable phosphor sheet to emit light in proportion to the stored radiation energy. The light emitted by the stimulable phosphor sheet when it is exposed to stimulating rays is photoelectrically detected and converted into an electric image signal, which is processed as desired to reproduce a visible image on a recording medium such as a photographic film or on a display device such as a cathode ray tube (CRT).

The radiation image recording and reproducing system using a stimulable phosphor sheet is advantageous over conventional radiography in that the image can be recorded over a very wide range (latitude) of radiation exposure and further in that the electric signal used for reproducing the visible image can be freely processed to improve the image quality for viewing, particularly for diagnostic purposes. More specifically, since the amount of light emitted upon stimulation after the radiation energy is stored on the stimulable phosphor sheet varies over a wide range in proportion to the amount of said stored energy, it is possible to obtain an image having desirable density regardless of the amount of exposure of the stimulable phosphor sheet to the radiation, by reading out the emitted light with an appropriate read-out gain and converting it into an electric signal to reproduce a visible image on a recording medium or a display device. The electric signal may further be processed as desired to obtain a radiation image suitable for viewing, particularly for diagnostic purposes. This is very advantageous in practical use.

As mentioned above, in the radiation image recording and reproducing system using a stimulable phosphor sheet, compensation for deviation of the level of the radiation energy stored on the stimulable phosphor sheet from a desired level can easily be carried out by adjusting the read-out gain to an appropriate value when photoelectrically reading out the light emitted by the stimulable phosphor sheet upon stimulation thereof. Therefore, the quality of the reproduced radiation image is not adversely affected by a fluctuation in radiation dose due to fluctuating tube voltage or MAS value of the radiation source, variation in the sensitivity of the stimulable phosphor sheet or the photodector, changes in radiation dose resulting from differences in the condition of the object, or differences in radiation transmittance of the object, and the like. Also, it is possible to obtain a desirable radiation image even when the radiation dose to the object is low. Further, it is possible to obtain a radiation image having a high image quality of high contrast, high sharpness and low noise, and the like, by converting the light emitted by the stimulable phosphor sheet into an electric signal, and processing the electric signal as desired.

However, in order to eliminate various influences caused by variations in radiographic exposure conditions and/or to obtain a radiation image having a high image quality or a high diagnostic efficiency and accuracy, it is necessary to investigate such image input conditions of the radiation image stored on the stimulable phosphor sheet as, for example, the level of radiation dose used for image recording, or the image input pattern which is determined by the portion of the object (e.g. the chest or the abdomen of the human body) or the image recording method used, such as plain image recording or contrasted image recording, before reproducing the radiation image to a visible image, and then to adjust the read-out gain to an appropriate value or to process the electric signal appropriately based on the detected image input conditions or the image input pattern. The image input conditions and the image input pattern will hereinafter be simply referred to as the image input information when they are referred to generically. It is also necessary to determine the scale factor to optimize the resolution in accordance with the contrast of the image input pattern, and to adjust image processing conditions to appropriate values in the case where image processing such as gradation processing is conducted on the read-out image signal.

Investigation of the image input information may be conducted prior to the visible image reproduction by use of the method as disclosed in Japanese Unexamined Patent Publication No. 58(1983)-67240. In the disclosed method, a read-out operation for detecting the image input information of a radiation image stored on a stimulable phosphor sheet hereinafter referred to as the preliminary read-out) is conducted in advance by use of stimulating rays having stimulation energy of a level lower than the level of the stimulation energy of stimulating rays used in a read-out operation for obtaining a visible image for viewing, particularly for diagnostic purposes (hereinafter referred to as the final read-out), and thereafter the final read-out is carried out. In the final read-out, the read-out gain and/or the scale factor is adjusted to an appropriate value, and/or an appropriate image processing is conducted, on the basis of the image input information obtained by the preliminary read-out. As disclosed, for example, in Japanese Unexamined Patent Publication Nos. 58(1983)-67242 and 58(1983)-67243, this method may be carried out by a radiation image read-out apparatus comprising:

(i) a final read-out system comprising a means for emitting stimulating rays to a stimulable phosphor sheet carrying a radiation image of an object stored thereon, and a light detection means for photoelectrically detecting light carrying the radiation image and emitted by said stimulable phosphor sheet upon exposure to stimulating rays, (ii) a preliminary read-out system for conducting preliminary read-out by use of stimulating rays having stimulation energy of a level lower than the level of the stimulation energy of stimulating rays used in final read-out prior to the final read-out for obtaining a visible radiation image, and (iii) a control means for adjusting read-out conditions in the final read-out and/or image processing conditions on the basis of image input information on said stimulable phosphor sheet obtained by said preliminary read-out.

As described above, the level of the stimulating rays used in the preliminary read-out is lower than the level of the stimulating rays used in the final read-out. That is, the effective energy of the stimulating rays which the stimulable phosphor sheet receives per unit area in the preliminary read-out should be lower than the effective energy of the stimulating rays used in the final read-out. In order to make the level of the stimulating rays used in the preliminary read-out lower than the level of the stimulating rays in the final read-out, the output of the stimulating ray source such as a laser beam source may be decreased in the preliminary read-out, or the stimulating rays emitted by the stimulating ray source may be attenuated by an ND filter, an AOM, or the like, positioned in the optical path.

Alternatively, a stimulating ray source for the preliminary read-out may be positioned independently of the stimulating ray source for the final read-out, and the output of the former may be made lower than the output of the latter. Or, the beam diameter of the stimulating rays may be increased, the scanning speed of the stimulating rays may be increased, or the moving speed of the stimulable phosphor sheet may be increased in the preliminary read-out.

In the aforesaid method, since the image input conditions and the image input pattern of a radiation image stored on the stimulable phosphor sheet can be investigated in advance, it is possible to obtain a radiation image having an improved image quality, particularly a high diagnostic efficiency and accuracy, by adjusting the read-out gain and the scale factor in the manner most suitable for the image input pattern on the basis of the detected image input information without using a read-out system having a wide dynamic range.

When a radiation image is recorded on the stimulable phosphor sheet, subdivision image recording is often carried out. In the subdivision image recording, the recording region on the stimulable phosphor sheet is divided into a plurality of subdivisions, and the respective subdivisions are exposed to a radiation for image recording. The subdivision image recording is economical since, for example, when an image of a small object portion is recorded on a large stimulable phosphor sheet, images of a plurality of object portions may be recorded on a single stimulable phosphor sheet. Also, the radiation image recording and read-out processing speeds become high.

However, in the case where a radiation image is read out from a stimulable phosphor sheet subjected to the subdivision image recording, ascertaining of the image input information based on the preliminary read-out may become incorrect. Specifically, as shown, for example, in FIG. 2, when the number (three in this example) of the subdivisions where image recording is conducted actually is smaller than the total number (four in this example) of the subdivisions divided in the subdivision image recording, the preliminary read-out image signals also include a read-out signal detected from the subdivision where no image is recorded. Therefore, a histogram of the preliminary read-out image signals, or the like, formed for ascertaining the image input information does not correctly represent the radiaton images actually stored on the stimulable phosphor sheet.

SUMMARY OF THE INVENTION

The primary object of the present invention is to provide a radiation image read-out method wherein image input information on an object is ascertained correctly by eliminating adverse effects of a read-out image signal detected from a portion of a stimulable phosphor sheet where no radiation image is recorded.

Another object of the present invention is to provide a radiation image read-out method which always provides a reproduced visible image having an improved image quality, particularly a high diagnostic efficiency and accuracy.

The specific object of the present invention is to provide an apparatus for carrying out the radiation image read-out method.

The present invention provides a radiation image read-out method in which, prior to final read-out for exposing a stimulable phosphor sheet carrying a radiation image of an object stored thereon to stimulating rays which cause the stimulable phosphor sheet to emit light in proportion to the stored radiation energy, and photoelectrically detecting the emitted light by use of a light detection means to obtain an electric image signal for reproducing a visible image, preliminary read-out for approximately detecting the radiation image stored on the stimulable phosphor sheet is conducted by use of stimulating rays of a level lower than the level of stimulating rays used in the final read-out, read-out conditions in the final read-out and/or image processing conditions are adjusted on the basis of the information obtained by the preliminary read-out, and the final read-out is conducted by use of the adjusted conditions, wherein the improvement comprises the steps of:

(i) in the case where said radiation image is read out from the stimulable phosphor sheet subjected to subdivision image recording conducted by exposing a plurality of subdivisions on said stimulable phosphor sheet respectively to a radiation in the radiation image recording step, eliminating an image signal at a subdivision unexposed to the radiation from preliminary read-out image signals, which are obtained by said preliminary read-out, on the basis of information on said subdivision image recording, and (ii) adjusting said read-out conditions in said final read-out and/or said image processing conditions on the basis of the other preliminary read-out image signals.

The present invention also provides a radiation image read-out apparatus including:

(i) a final read-out system comprising a means for emitting stimulating rays to a stimulable phosphor sheet carrying a radiation image of an object stored thereon, and a light detection means for photoelectrically detecting light carrying the radiation image and emitted by said stimulable phosphor sheet upon exposure to stimulating rays, (ii) a preliminary read-out system for conducting preliminary read-out by use of stimulating rays having stimulation energy of a level lower then the level of the stimulation energy of stimulating rays used in final read-out prior to the final read-out for obtaining a visible radiation image, and (iii) a control means for adjusting read-out conditions in the final read-out and/or image processing conditions on the basis of image input information on said stimulable phosphor sheet obtained by said preliminary read-out, wherein the improvement comprises the provision of:

(iv) an unexposed region recognition means for receiving information on subdivision image recording conducted in the step of radiation image recording on said stimulable phosphor sheet, determining the region of an unexposed subdivision, where no radiation image recording is conducted, on the basis of said information on subdivision image recording, and generating a region designating signal representing said region, and (v) a signal extraction means for receiving preliminary read-out image signals generated by said preliminary read-out system and said region designating signal, eliminating an image signal at said region represented by said region designating signal from said preliminary read-out image signals, and sending only the other preliminary read-out image signals to said control means.

With the radiation image read-out method and apparatus in accordance with the present invention, when the read-out conditions in the final read-out and/or image processing conditions are adjusted based on the preliminary read-out, it is possible to correctly ascertain the image input information on the object and to adjust the read-out conditions in the final read-out and/or image processing conditions to appropriate values by eliminating adverse effects of the read-out image signal detected at a portion of the stimulable phosphor sheet where no radiation image recording was conducted. Accordingly, with the present invention, it becomes possible to always provide a reproduced visible image having an improved image quality, particularly a high diagnostic efficiency and accuracy.

BRIEF DESCRIPTION OF THE DRAWINGS

FIG. 1 is a schematic view showing the configuration of the radiation image recording and reproducing system wherein radiation image read-out is conducted by an embodiment of the radiation image read-out apparatus in accordance with the present invention, FIG. 2 is an explanatory view showing the condition of radiation image recording on the stimulable phosphor sheet, FIG. 3 is a schematic view showing the configuration of the radiation image recording and reproducing system wherein radiation image read-out is conducted by another embodiment of the radiation image read-out apparatus in accordance with the present invention, and FIG. 4 is an explanatory view showing the condition of radiation image recording on the stimulable phosphor sheet.

DESCRIPTION OF THE PREFERRED EMBODIMENTS

The present invention will hereinbelow be described in further detail with reference to the accompanying drawings.

FIG. 1 shows a radiation image recording and reproducing system provided with an embodiment of the radiation image read-out apparatus of the present invention. Basically, the radiation image recording and reproducing system comprises a radiation image recording section 20, a preliminary read-out section 30, a final read-out section 40, and an image reproducing section 50. At the radiation image recording section 20, a radiation 102 is emitted by a radiation source 100 constituted by an X-ray tube or the like toward an object 101. A stimulable phosphor sheet 103 for storing radiation energy thereon is placed at the position exposed to the radiation 102 passing through the object 101, and a radiation image of the object 101 is stored on the stimulable phosphor sheet 103.

The stimulable phosphor sheet 103 carrying the radiation image of the object 101 stored thereon is sent to the preliminary read-out section 30 by a sheet conveyance means 110 constituted by a conveyor roller or the like. At the preliminary read-out section 30, a laser beam 202 emanated by a laser beam source 201 is first passed through a filter 203 for cutting off light having a wavelength within a range identical with the range of the wavelength of the light emitted by the stimulable phosphor sheet 103 upon stimulation thereof by the laser beam 202. Then, the laser beam 202 is one-dimensionally deflected by a light deflector 204 such as a galvanometer mirror and directed onto the stimulable phosphor sheet 103 by a plane reflection mirror 205. The laser beam source 201 is selected so that the laser beam 202 emitted thereby has a wavelength distribution different from and far apart from the wavelength distribution of the light emitted by the stimulable phosphor sheet 103 upon stimulation thereof. While the laser beam 202 impinges upon the stimulable phosphor sheet 103, the stimulable phosphor sheet 103 is moved in the direction as indicated by the arrow 206 (i.e. the sub-scanning direction) by a sheet conveying means 210 constituted by conveyor rollers or the like and, thus, the whole surface of the stimulable phosphor sheet 103 is exposed to and scanned by the laser beam 202. The power of the laser beam source 201, the beam diameter of the laser beam 202, the scanning speed of the laser beam 202, and the moving speed of the stimulable phosphor sheet 103 are selected so that the stimulation energy of the laser beam 202 for preliminary read-out is smaller than the stimulation energy of the laser beam for final read-out conducted at the final read-out section 40.

When exposed to the laser beam 202 as mentioned above, the stimulable phosphor sheet 103 emits light in proportion to the radiation energy stored thereon, and the emitted light enters a light guide member 207 which may be of a shape and a material as disclosed in U.S. Pat. No. 4,346,295. The light is guided inside of the light guide member 207 through total reflection, emitted from a light output face of the light guide member 207 and received by a photodetector 208 constituted by a photomultiplier or the like. The light receiving face of the photodetector 208 is closely contacted with a filter for transmitting only light having the wavelength distribution of the light emitted by the stimulable phosphor sheet 103 and cutting off the light having the wavelength distribution of the stimulating rays, so that the photodetector 208 can detect only the light emitted by the stimulable phosphor sheet 103 upon stimulation thereof. The light detected by the photodetector 208 is converted into electric signals carrying the image input information, and amplified by an amplifier 209. The signals generated by the amplifier 209 are digitized by an A/D converter 211, and sent as preliminary read-out image signals Sp to a signal extraction circuit 220. The signal extraction circuit 220 extracts predetermined image signals Sp' from the preliminary read-out image signals Sp as will later be described in detail, and sends the extracted preliminary read-out image signals Sp' to a final read-out control circuit 314 at the final read-out section 40. Based on the image input information represented by the preliminary read-out image signals Sp', the final read-out control circuit 314 calculates a read-out gain setting value (a), a scale factor setting value (b), and a reproduced image processing condition setting value (c) through histogram analysis or the like.

After the preliminary read-out is finished, the stimulable phosphor sheet 103 is sent to the final read-out section 40. At this section, a laser beam 302 emitted by a laser beam source 301 is first passed through a filter 303 for cutting off light having a wavelength within the range identical with the range of the wavelength of the light emitted by the stimulable phosphor sheet 103 upon stimulation thereof by the laser beam 302. Then, the beam diameter of the laser beam 302 is strictly adjusted by a beam expander 304. The laser beam 302 is then deflected by a light deflector 305 formed of a galvanometer mirror or the like, and is made to impinge upon the stimulable phosphor sheet 103 by a plane reflection mirror 306. Between the light deflector 305 and the plane reflection mirror 306 is positioned an fθ lens 307 for maintaining the beam diameter of the laser beam 302 uniform during the scanning of the laser beam 302 on the stimulable phosphor sheet 103. While the laser beam 302 impinges upon the stimulable phosphor sheet 103, the stimulable phosphor sheet 103 is moved in the direction as indicated by the arrow 308 (i.e. sub-scanning direction) by a sheet conveying means 320 constituted by conveyor rollers or the like and, consequently, the whole area of the stimulable phosphor sheet 103 is exposed to and scanned by the laser beam 302. Upon exposure to the laser beam 302, the stimulable phosphor sheet 103 emits light in proportion to the radiation energy stored therein, and the light emitted enters a light guide member 309 which is made of the same material and has the same configuration as the light guide member 207 used for the preliminary read-out. The light emitted by the stimulable phosphor sheet 103 is guided inside of the light guide member 309 through total reflection, emitted from the light output face of the light guide member 309 and received by a photodetector 310 constituted by a photomultiplier or the like. The light receiving face of the photodetector 310 is closely contacted with a filter for selectively transmitting only the light having the wavelength distribution of the light emitted by the stimulable phosphor sheet 103, so that the photodetector 310 can detect only the light emitted thereby.

The output of the photodetector 310 photoelectrically detecting the light emission representing the radiation image stored on the stimulable phosphor sheet 103 is amplified to an appropriate level by an amplifier 311 the read-out gain of which has been adjusted by the read-out gain setting value (a) calculated by the control circuit 314. The amplified electric signals thus obtained are input to an A/D converter 312 which converts the electric signals into digital signals by use of a scale factor which has been adjusted by the scale factor setting value (b) to suit the width of signal fluctuation. The digital signals thus obtained are sent to a signal processing circuit 313, in which they are processed on the basis of the reproduced image processing condition setting value (c) so as to obtain a radiation image suitable for viewing, particularly for diagnostic purposes, and are output as read-out image signals (final read-out image signals) So.

The final read-out image signals So generated by the signal processing circuit 313 are input to a light modulator 401 at the image reproducing section 50. At the image reproducing section 50, a laser beam 403 emitted by a reproducing laser beam source 402 is modulated by the light modulator 401 on the basis of the final read-out image signals So received from the signal processing circuit 313, and is made to impinge upon a photosensitive material 405 such as a photographic film by a scanning mirror 404 for scanning the photosensitive material 405 by the laser beam 403. At this time, the photosensitive material 405 is moved normal to the aforesaid scanning direction, i.e. in the direction as indicated by the arrow 406. Accordingly, the radiation image represented by the final read-out image signals So is recorded on the photosensitive material 405. For reproducing the radiation image, it is possible to use any other appropriate method such as the aforesaid displaying on a CRT.

Signal extraction by the aforesaid signal extraction circuit 220 will hereinbelow be described in detail. The signal extraction circuit 220 receives an unexposed region designating signal St from an unexposed region recognition circuit 221. To the unexposed region recognition circuit 221, a subdivision image recording signal Sd is entered, for example, by manual operation. At the radiation image recording section 20, subdivision image recording may be conducted as shown in FIG. 2 on the stimulable phosphor sheet 103. By way of example, the subdivision image recording signal Sd represents the number of subdivisions in the subdivision image recording, and the exposed subdivisions where image recording is conducted actually among all subdivisions. For example, when subdivision identification numbers 1, 2, 3 and 4 are respectively assigned to the four subdivisions in the case shown in FIG. 2, the subdivision image recording signal Sd representing four as the number of the subdivisions, and the subdivisions 1, 2 and 3 as the exposed subdivisions is entered to the unexposed region recognition circuit 221.

Upon receiving the subdivision image recording signal Sd, the unexposed region recognition circuit 221 generates an unexposed region designating signal St representing the unexposed subdivision, i.e. the subdivision where no image recording is conducted, on the stimulable phosphor sheet 103 (the subdivision 4 in the example of FIG. 2) on the basis of the subdivision image recording signal Sd. The subdivision image recording is conducted in a predetermined format. For example, in the case of four-on-one subdivision image recording, image recording is conducted respectively at four equal subdivisions as shown in FIG. 2. The unexposed region recognition circuit 221 stores regions of the subdivisions in the respective formats, determines the region of the unexposed subdivision based on the number of the subdivisions and the exposed subdivisions represented by the subdivision image recording signal Sd, and generates the unexposed region designating signal St representing the region of the unexposed subdivision. Specifically, in the example shown in FIG. 2, the unexposed region recognition circuit 221 recognizes, based on the subdivision image recording signal Sd representing four as the number of subdivisions and exposed subdivisions 1, 2 and 3, that the subdivision 4 is an unexposed subdivision, and generates the unexposed region designating signal St which represents the region of the subdivision 4, i.e. a quarter region at the right lower section on the stimulable phosphor sheet 103.

Upon receiving the unexposed region designating signal St, the signal extraction circuit 220 eliminates the image signal at the region represented by the unexposed region designating signal St from the preliminary read-out image signals Sp detected over the entire area of the stimulable phosphor sheet 103, and sends only the remaining preliminary read-out image signals Sp' to the control circuit 314. Accordingly, the control circuit 314 calculates the read-out gain setting value (a), the scale factor setting value (b), and the reproduced image processing condition setting value (c) based only on the preliminary read-out image signals Sp' at the regions actually exposed to a radiation for image recording, i.e. the subdivisions 1, 2 and 3 in this example. Thus it becomes possible to adjust the setting values (a), (b) and (c) to values suitable for the radiation images actually stored on the stimulable phosphor sheet 103.

In the case where the radiation image recording section 20 and the preliminary read-out section 30 are connected by the sheet conveyance means 110 or the like and respective stimulable phosphor sheets 103 are conveyed to the preliminary read-out section 30 in the sequence of image recording, subdivision image recording signals Sd may be entered to the unexposed region recognition circuit 221 merely in the sequence of image recording. Specifically, for example, the unexposed region recognition circuit 221 may be provided with a storage means for sequentially storing the unexposed region designating signals St for the respective stimulable phosphor sheets 103, and may be constituted so that reading of the unexposed region designating signals St from the storage means and input thereof to the signal extraction circuit 220 are carried out in the sequence of signal storing in synchronization with the preliminary read-out. In this case, it is possible to use the respective unexposed region designating signals St for the aforesaid signal extraction in exact conformity with the respective stimulable phosphor sheets 103.

On the other hand, in the case where the radiation image recording section 20 and the preliminary read-out section 30 are positioned independently of each other and the stimulable phosphor sheets 103 are not necessarily sent to the preliminary read-out step in the sequence of image recording, identification codes such as bar codes inherent to the respective stimulable phosphor sheets 103 should be entered to the unexposed region recognition circuit 221 together with the subdivision image recording signals Sd, and the unexposed region designating signals St generated by the unexposed region recognition circuit 221 should be stored in the storage means in conformity with the identification codes. In this case, the identification code is read from the stimulable phosphor sheet 103 in the preliminary read-out step, and the unexposed region designating signal St corresponding to the identification code is read from the storage means and entered to the signal extraction circuit 220.

For a stimulable phosphor sheet 103 on which a single radiation image is recorded over the whole recording region, the aforesaid signal extraction should not be conducted by the signal extraction circuit 220. For this purpose, for example, the subdivision image recording signal Sd representing one as the number of subdivisions and the exposed subdivision 1 should be entered to the unexposed region recognition circuit 221, or no subdivision image recording signal Sd should be entered thereto for such a stimulable phosphor sheet 103. Also, at this time, the signal extraction circuit 220 should be deactivated so that all of the preliminary read-out image signals Sp are allowed to pass therethrough.

The terminal device for entering the subdivision image recording signal Sd to the unexposed region recognition circuit 221 should preferably be positioned in the vicinity of the radiation image recording section 20 so that the subdivision image recording signal Sd may be entered from the terminal device simultaneously with radiation image recording.

Another embodiment of the radiation image read-out apparatus in accordance with the present invention will hereinbelow be described with reference to FIG. 3. In FIG. 3, similar elements are numbered with the same reference numerals with respect to FIG. 1. In this embodiment, the preliminary read-out image signals Sp' obtained by the signal extraction circuit 220 are sent to the control circuit 314 via a second signal extraction circuit 222. Also, at the radiation image recording section 20, an irradiation field stop 104 for limiting the irradiation field of the radiation 102 is positioned between the radiation source 100 and the object 101.

When subdivision image recording is conducted by limiting the irradiation field by the irradiation field stop 104, the condition of image recording on the stimulable phosphor sheet 103 becomes, for example, as shown in FIG. 4. In this example, an irradiation field 103A is limited to an area smaller than the possible recording region at the subdivisions 1 and 2. At a region 103B outside of the irradiation field 103A, exposure to the radiation 102 is prevented by the irradiation field stop 104. Therefore, the region 103B is substantially identical with the unexposed subdivision 4. When the read-out gain setting value (a), the scale factor setting value (b), and the reproduced image processing condition setting value (c) are determined based on the preliminary read-out image signals Sp' including the read-out image signal at the region 103B, the same problem as when the setting values (a), (b) and (c) are determined based on the preliminary read-out image signals Sp including the read-out image signal at the unexposed subdivision 4 arises.

Accordingly, this embodiment is provided with an irradiation field recognition circuit 223 to which the preliminary read-out image signals Sp' and the subdivision image recording signal Sd are entered. The irradiation field recognition circuit 223 determines the exposed subdivisions based on the subdivision image recording signal Sd, and recognizes the irradiation fields in the respective exposed subdivisions by use of the preliminary read-out signals Sp'. As the irradiation field recognition circuit 223, it is possible to employ an apparatus for carrying out the method as proposed in Japanese Patent Application No. 59(1984)-160355. The irradiation field recognition circuit 223 sends a signal Sg representing the regions recognized as the irradiation fields in the respective subdivisions to the second signal extraction circuit 222. The second signal extraction circuit 222 extracts the image signals at the regions represented by the signal Sg from the preliminary read-out image signals Sp', and sends the preliminary read-out image signals Sp" thus extracted to the control circuit 314. Therefore, the read-out gain setting value (a), the scale factor setting value (b), and the reproduced image processing condition setting value (c) are adjusted to appropriate values on the basis of only the preliminary read-out image signals Sp" at the portions of the stimulable phosphor sheet 103 which were actually exposed to the radiation and carry the radiation images stored thereon.

As described, for example, in Japanese Unexamined Patent Publication No. 58(1983)-67242, a single read-out system may be used for the preliminary read-out and the final read-out. In this case, after the preliminary read-out is finished, the stimulable phosphor sheet is returned to the read-out system by a sheet conveying means and the final read-out is carried out. In the preliminary read-out step, the energy of the stimulating rays is adjusted to be lower than the energy of stimulating rays used in the final read-out. The present invention is also applicable to such a case.

We claim:

1. A radiation image read-out method in which, prior to final read-out for exposing a stimulable phosphor sheet carrying a radiation image of an object stored thereon to stimulating rays which cause the stimulable phosphor sheet to emit light in proportion to the stored radiation energy, and photoelectrically detecting the emitted light by use of a light detection means to obtain an electric image signal for reproducing a visible image, preliminary read-out for approximately detecting the radiation image stored on the stimulable phosphor sheet is conducted by use of stimulating rays of a level lower than the level of stimulating rays used in the final read-out, read-out conditions in the final read-out and/or image processing conditions are adjusted on the basis of the information obtained by the preliminary read-out, and the final read-out is conducted by use of the adjusted conditions, wherein the improvement comprises the steps of:
  (i) in the case where said radiation image is read out from the stimulable phosphor sheet subjected to subdivision image recording conducted by exposing a plurality of subdivisions on said stimulable phosphor sheet respectively to a radiation in the radiation image recording step, eliminating an image signal at a subdivision unexposed to the radiation from preliminary read-out image signals, which are obtained by said preliminary read-out, on the basis of information on said subdivision image recording, and
  (ii) adjusting said read-out conditions in said final read-out and/or said image processing conditions on the basis of the other preliminary read-out image signals.

2. A method as defined in claim 1 wherein, when an irradiation field on said stimulable phosphor sheet is limited in the radiation image recording step, said irradiation field is detected at each of said subdivisions, image signals at said irradiation field are extracted from said other preliminary read-out image signals obtained by eliminating said image signal at said unexposed subdivision, and adjusting said read-out conditions in said final read-out and/or said image processing conditions on the basis of said extracted image signals.

3. A radiation image read-out apparatus including:
  (i) a final read-out system comprising a means for emitting stimulating rays to a stimulable phosphor sheet carrying a radiation image of an object stored thereon, and a light detection means for photoelectrically detecting light carrying the radiation image and emitted by said stimulable phosphor sheet upon exposure to stimulating rays,
  (ii) a preliminary read-out system for conducting preliminary read-out by use of stimulating rays having stimulation energy of a level lower than the level of the stimulation energy of stimulating rays used in final read-out prior to the final read-out for obtaining a visible radiation image, and
  (iii) a control means for adjusting read-out conditions in the final read-out and/or image processing conditions on the basis of image input information on said stimulable phosphor sheet obtained by said preliminary read-out, wherein the improvement comprises the provision of:
  (iv) an unexposed region recognition means for receiving information on subdivision image recording conducted in the step of radiation image recording on said stimulable phosphor sheet, determining the region of an unexposed subdivision, where no radiation image recording is conducted, on the basis of said information on subdivision image recording, and generating a region designating signal representing said region, and
  (v) a signal extraction means for receiving preliminary read-out image signals generated by said preliminary read-out system and said region designating signal, eliminating an image signal at said region represented by said region designating signal from said preliminary read-out image signals, and sending only the other preliminary read-out image signals to said control means.

4. An apparatus as defined in claim 3 further comprising a terminal device positioned in the vicinity of a radiation image recording section for entering said information on said subdivision image recording to said unexposed region recognition means.

5. An apparatus as defined in claim 3 further comprising a second signal extraction means for receiving a signal representing a region of an irradiation field in each of subdivisions on said stimulable phosphor sheet, extracting image signals at said region of said irradiation field from said other preliminary read-out image signals obtained by eliminating said image signal at said unexposed subdivision, and sending only said extracted image signals to said control means.

* * * * *